US008452585B2

(12) United States Patent
Toutanova et al.

(10) Patent No.: US 8,452,585 B2
(45) Date of Patent: May 28, 2013

(54) DISCRIMINATIVE SYNTACTIC WORD ORDER MODEL FOR MACHINE TRANSLATION

(75) Inventors: Kristina Nikolova Toutanova, Redmond, WA (US); Pi-Chuan Chang, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 1112 days.

(21) Appl. No.: 12/061,313

(22) Filed: Apr. 2, 2008

(65) Prior Publication Data
US 2008/0319736 A1 Dec. 25, 2008

Related U.S. Application Data

(60) Provisional application No. 60/945,475, filed on Jun. 21, 2007.

(51) Int. Cl.
*G06F 17/27* (2006.01)
(52) U.S. Cl.
USPC ............... 704/9; 704/4; 704/5; 704/8; 704/10
(58) Field of Classification Search
None
See application file for complete search history.

(56) References Cited

U.S. PATENT DOCUMENTS

| | | | | |
|---|---|---|---|---|
| 5,678,051 A | 10/1997 | Aoyama | | 395/752 |
| 5,826,219 A | 10/1998 | Kutsumi | | 704/4 |
| 6,243,669 B1 | 6/2001 | Horiguchi et al. | | 704/9 |
| 7,003,445 B2 | 2/2006 | Humphreys et al. | | 704/9 |
| 7,200,550 B2 | 4/2007 | Menezes et al. | | 704/10 |
| 2002/0040292 A1* | 4/2002 | Marcu | | 704/4 |
| 2003/0023423 A1 | 1/2003 | Yamada et al. | | 704/2 |
| 2003/0182102 A1 | 9/2003 | Corston-Oliver et al. | | 704/9 |
| 2004/0024581 A1 | 2/2004 | Koehn et al. | | 704/2 |
| 2005/0015240 A1 | 1/2005 | Appleby | | 704/9 |
| 2006/0095248 A1* | 5/2006 | Menezes et al. | | 704/3 |
| 2006/0106595 A1* | 5/2006 | Brockett et al. | | 704/9 |
| 2006/0111891 A1* | 5/2006 | Menezes et al. | | 704/3 |
| 2006/0111892 A1* | 5/2006 | Menezes et al. | | 704/7 |
| 2006/0111896 A1* | 5/2006 | Menezes et al. | | 704/10 |
| 2006/0142995 A1 | 6/2006 | Knight et al. | | 704/9 |
| 2007/0083357 A1* | 4/2007 | Moore et al. | | 704/4 |

OTHER PUBLICATIONS

Vogel et al., "The CMU Statistical Machine Translation System," in Proc. of the MT Summit IX (2003).
NieBen et al., "Morpho-Syntactic Analysis for Reordering in Statistical Machine Translation," MT Summit VIII (pp. 247-252) (2001).
Collins et al., "Clause Restructuring for Statistical Machine Translation," Proceedings of the 43$^{rd}$ Annual Meeting of the ACL, pp. 531-540, Ann Arbor, Jun. 2005.

* cited by examiner

*Primary Examiner* — Leonard Saint Cyr
(74) *Attorney, Agent, or Firm* — Westman, Champlin & Kelly, P.A.; Theodore M. Magee

(57) ABSTRACT

A discriminatively trained word order model is used to identify a most likely word order from a set of word orders for target words translated from a source sentence. For each set of word orders, the discriminatively trained word order model uses features based on information in a source dependency tree and a target dependency tree and features based on the order of words in the word order. The discriminatively trained statistical model is trained by determining a translation metric for each of a set of N-best word orders for a set of target words. Each of the N-best word orders are projective with respect to a target dependency tree and the N-best word orders are selected using a combination of an n-gram language model and a local tree order model.

17 Claims, 7 Drawing Sheets

DISCRIMINATIVE SYNTACTIC WORD ORDER MODEL FOR MACHINE TRANSLATION

The present application is based on and claims the benefit of U.S. provisional patent application Ser. No. 60/945,475, filed Jun. 21, 2007, the content of which is hereby incorporated by reference in its entirety.

BACKGROUND

Deciding the correct order of words in a translated sentence is one of the hardest problems in machine translation. This problem is especially important for translations between languages that have significantly different word orders, such as translations from English to Japanese, German, or Russian. Predicting word orders is challenging because existing statistical models are not sufficiently accurate and because the search problem is very hard due to the extremely large space of possible orders.

The discussion above is merely provided for general background information and is not intended to be used as an aid in determining the scope of the claimed subject matter.

SUMMARY

A discriminatively trained word order model is used to identify a most likely word order from a set of word orders for target words translated from a source sentence. For each set of word orders, the discriminatively trained word order model uses features based on information in a source dependency tree and a target dependency tree and features based on the order of words in the word order. The discriminatively trained statistical model is trained by determining a translation metric for each of a set of N-best word orders for a set of target words. Each of the N-best word orders are projective with respect to a target dependency tree and the N-best word orders are selected using a combination of an n-gram language model and a local tree order model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein use discriminative training to train a statistical model that can select a best word order for a set of translated words from a set of possible word orders. Under one embodiment, the statistical model is discriminatively trained by applying a translation metric to a set of possible word orders and discriminatively training the statistical model so that it optimizes an objective function for the word order with the highest translation metric score. Under some embodiments, the set of word orders used in training is selected by requiring that the word orders be projective with respect to a target dependency tree and further by scoring the word orders using a combination of an n-gram language model and a local tree order model. Once trained, the word order model can be used to reorder target words formed by a machine translation system to improve the translation of a source sentence.

Figure 1:
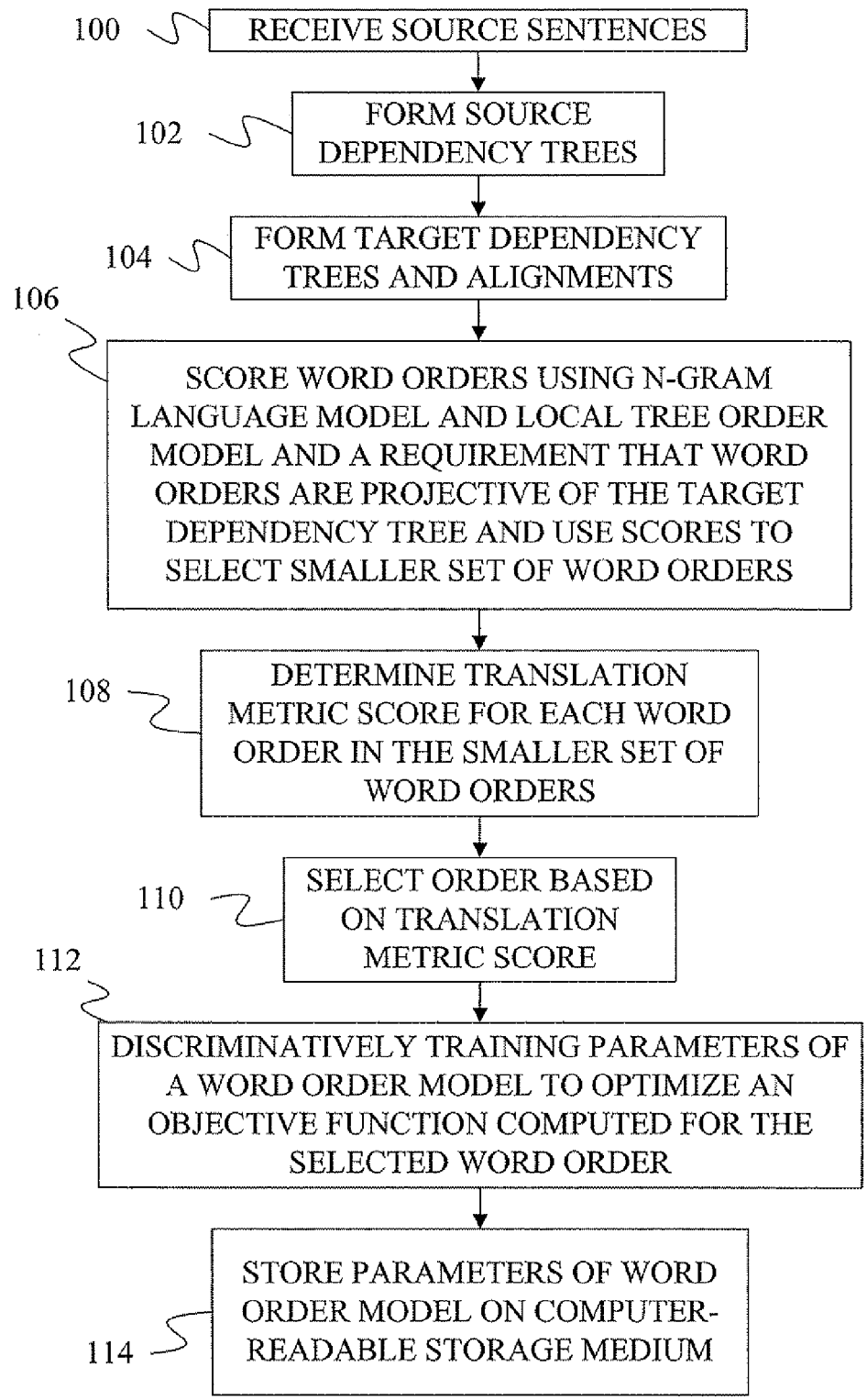
FIG. 1 is a flow diagram of a method of discriminatively training a word order model under one embodiment.
Figure 2:
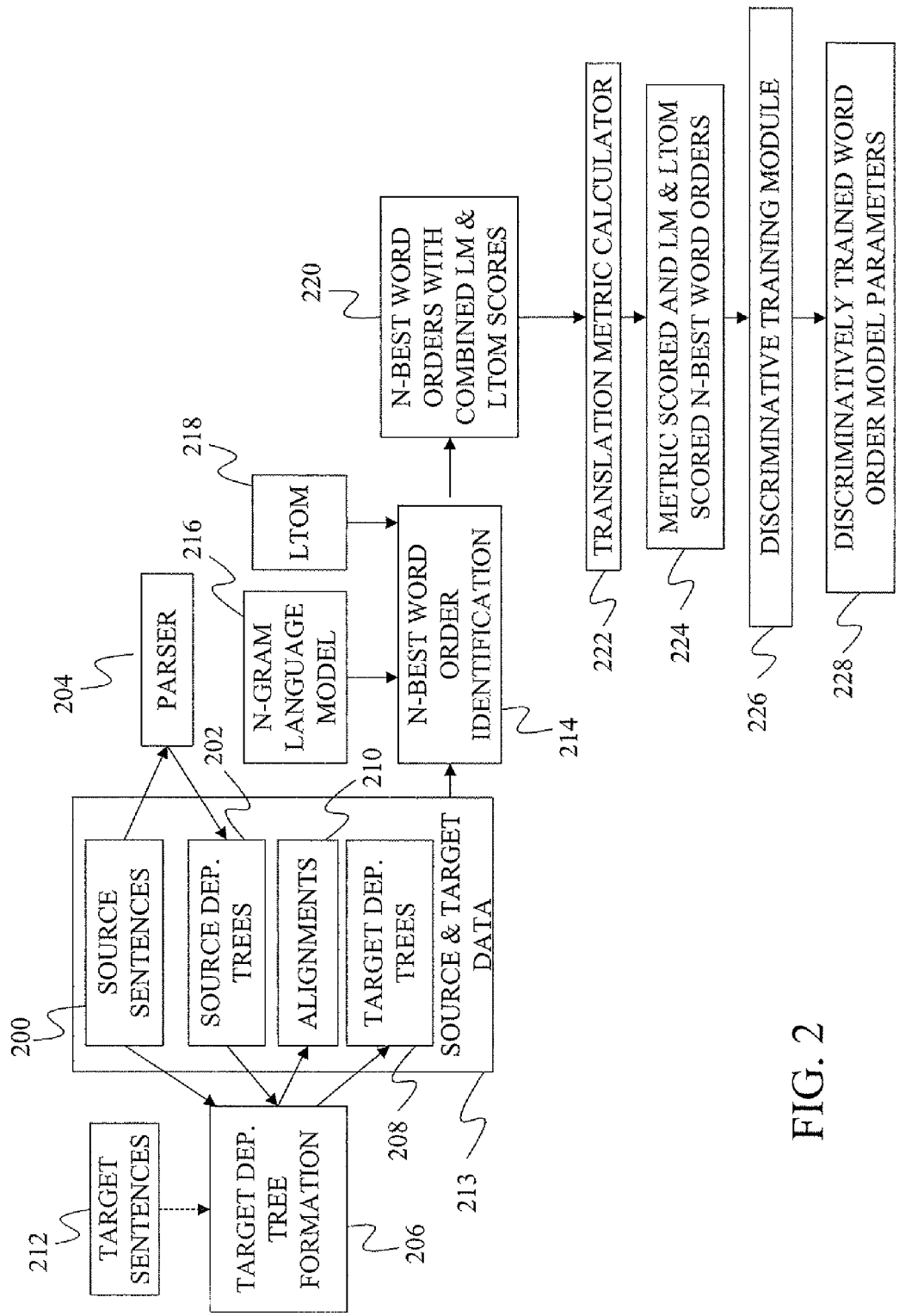
FIG. 2 is a block diagram of elements used in the method of FIG. 1.

FIG. 1 provides a method of discriminatively training a word order model for ordering words translated from a source sentence. FIG. 2 provides a block diagram of elements used in the method of FIG. 1.

In step 100, a set of source sentences 200 written in a source language (such as English or Japanese, for example) is received. At step 102, source dependency trees 202 are formed by applying parser 204 to source sentences 200. Under one embodiment, parser 204 is a broad-coverage rule-based syntactic parser that produces syntactic analysis at varying levels of depth. Under one embodiment, the dependency parser produces unlabeled, ordered dependency trees where each source word is annotated with a part of speech. Source dependency trees 202 provide a hierarchical description of the relationship between words within the source sentences with one word forming a root node in the dependency tree and other words forming nodes that descend from the root node.

Figure 3:
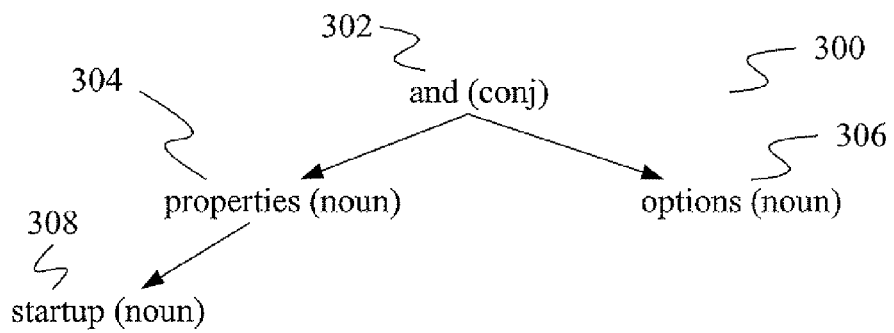
FIG. 3 is an example of a source dependency tree.

FIG. 3 provides an example of a source dependency tree 300 for the source sentence "startup properties and options." Source dependency tree 300 has a root node 302, nodes 304 and 306 that extend from root node 302 and a node 308 that extends from node 304. The word "and" has been assigned to node 302, the word "properties" has been assigned to node 304, the word "options" has been assigned to node 306, and the word "startup" has been assigned to node 308. Each word in the dependency tree has also been labeled with a part of speech. In particular, the words "startup", "properties" and "options" have been labeled as nouns and the word "and" has been labeled a conjunction.

Nodes 304 and 306 are child nodes of root node 302 and root node 302 is said to be the parent or head node of nodes 304 and 306. Further, the words of nodes 304 and 306 are said to modify or be modifiers of the word of their parent or head node 302. Similarly, node 308 is a child node of node 304 and node 304 is said to be the parent or head node of node 308.

At step 104, source sentences 200 and source dependency trees 202 are used by a target dependency tree formation unit 206 to form target dependency trees 208 and a set of alignments 210. Target dependency trees 208 include target words translated from the source words in the source sentences 200 that are arranged in a hierarchical manner similar to that of the source dependency trees 202. Alignments 210 describe alignments between words in the source dependency tree 202 and words in the target dependency tree 208. The alignments can include one-to-one, one source-to-many target, and many source-to-one target.

Under one embodiment, the target dependency trees 208 and alignments 210 are formed from the source dependency trees 202 using a machine translation system that is trained to translate sub-parts of the source dependency tree, referred to as treelets, into target treelets of the target dependency trees 208. Together, a target treelet and the source treelet it is a translation of form a treelet translation pair. The first step in the translation is to form a list of possible treelet translation pairs that apply to each node in the source dependency tree. This is done by comparing the portion of the dependency tree rooted at a selected node in the source dependency tree to the source treelet portion of each treelet translation pair. A treelet translation pair is said to match the node if it covers at least part of the portion of the source dependency tree rooted at the selected source node and if it is also rooted at the source node.

Once the list of possible treelet translation pairs has been formed for each node in the source dependency tree, a bottom-up search is performed. At each node in the source dependency tree, one of the treelet translation pairs is selected. If the treelet translation pair covers the entire portion of the tree rooted at the selected node, a score for the treelet translation pair is calculated and the translation is added as a possible translation. If the treelet pair covers only part of the portion of the source dependency tree rooted at the selected node, all possible combinations of the treelet translation pair and the treelet translation pairs associated with the nodes that are not covered are formed and scored. The N-best combinations of treelet translation pairs are retained for the node. The best scoring combination of treelet translations at the root node of the source dependency tree is then selected as the final translation of the source dependency tree and is used to form the target dependency tree. In such systems, alignments 210 are formed as part of the translation process, because the treelet translation pairs contain word alignments.

In other embodiments, target dependency trees 208 are formed based on target sentences 212 that are known translations of source sentences 200 and source dependency trees 202. In such embodiments, the words of target sentences 212 are aligned with source sentences 200 using a standard word alignment algorithm to form alignments 210. Using these alignments, the source dependency tree is then projected onto a target dependency tree. For one-to-one alignments, nodes in the source dependency tree project directly to nodes in the target dependency tree. For alignments in which many source words are aligned with a single target word, the source nodes are condensed from the source dependency tree into a single node in the target dependency tree. For a source word in the source dependency tree that is aligned with many target words, the source node to the right most of the many target words is projected onto the target dependency tree and the remainder of the target words are placed beneath this projected target word as child nodes of the target word in the target dependency tree. Unaligned target words are attached into the dependency structure as follows. Assume there is an unaligned word $t_j$ at position j. With i<j and k>j be the target positions closest to j such that $t_i$ depends on $t_k$ or vice versa. Attach $t_j$ to the lower of $t_i$ or $t_k$. If all of the nodes to the left (or right) of position j are unaligned, attached $t_j$ to the left-most (or right-most) word that is aligned.

Note that in an embodiment that uses known translations of a source sentence to form the target dependency trees, the target dependency trees will be projective with respect to the correct order of the given correct words and the re-ordering algorithm can potentially recover the correct translation. However, in embodiments that use machine translation, the target dependency trees may include one or more incorrect translations of the words in the source sentences and may not be projective with respect to the correct order of these words.

Figure 4:
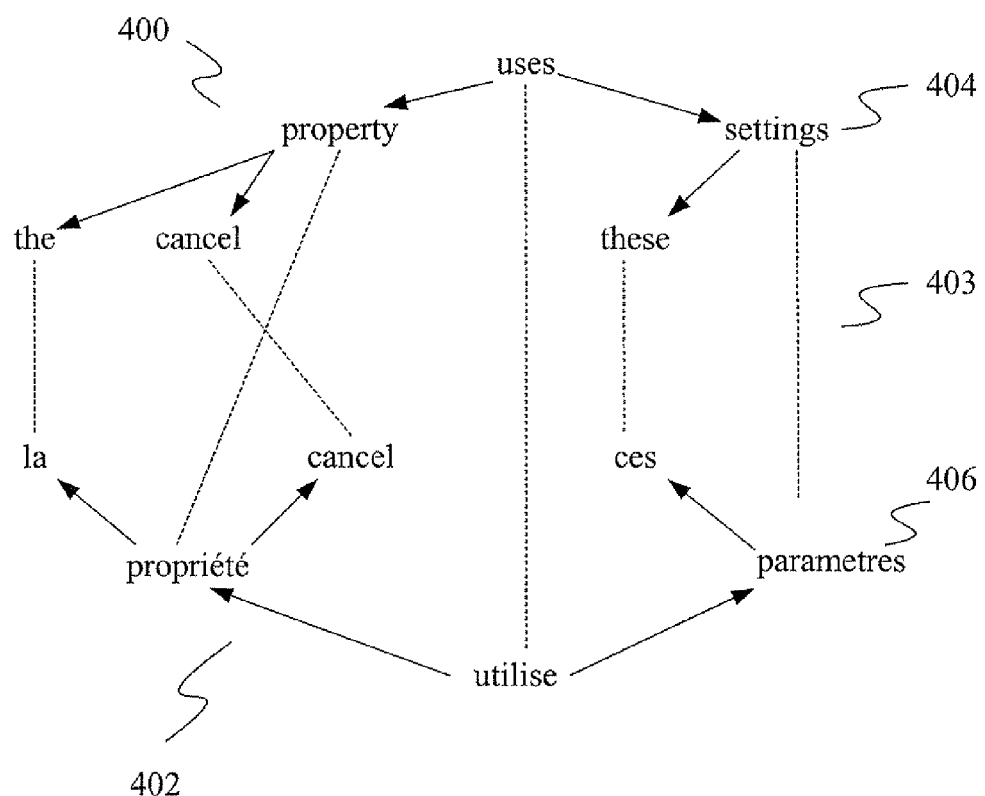
FIG. 4 is an example of a source dependency tree aligned with a target dependency tree.

FIG. 4 provides an example of a source dependency tree 400 and target dependency tree 402 and a set of alignments 403, shown with dotted lines. For example, "settings" 404 is aligned with "parameters" 406. Source dependency tree 400 is for the English sentence "the cancel property uses the settings" and target dependency tree 402 is for the target sentence "law propriété cancel utilize ces parametērs."

Together, source sentences 200, source dependency trees 202, alignments 210 and target dependency trees 208 form source and target data 213.

In step 106, an N-best word order identification unit 214 identifies a set of N possible word orders for the target words of each of the target dependency trees using an n-gram language model 216, a local tree order model 218, and source and target data 213.

During the identification of the N possible word orders, N-best word order identification unit 214 restricts the possible word orders to only those word orders that are projective with respect to the respective target dependency tree. An order of words in a sentence is projective with respect to a dependency tree if each word and its descendents form a contiguous subsequence in the ordered sentence.

Figure 5:
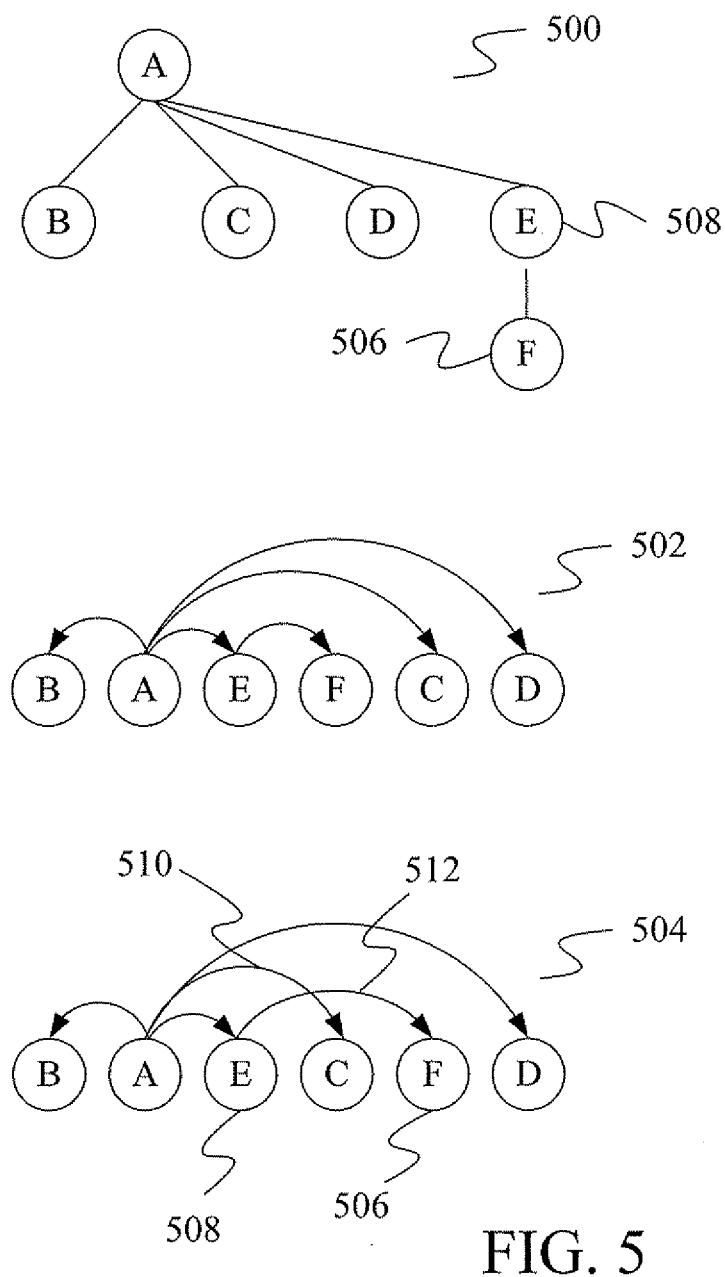
FIG. 5 is an example of a target dependency tree, a projective word order and a non-projective word order.

FIG. 5 provides an example of a target dependency tree 500, a projective word order 502 of target dependency tree 500 and a word order 504 that is not projective with respect to target dependency tree 500. Word order 504 is not projective with respect to target dependency tree 500 because child node 506 of parent node 508 is not contiguous with parent node 508 in word order 504. In general, in the depictions of word orders shown in FIG. 5, if a dependency line, such as dependency line 510 crosses another dependency line such as dependency line 512, which connects a parent node to a child node, the word order will not be projective. If on the other hand, all of the dependency lines do not cross other dependency lines as shown in word order 502, the word order is projective with respect to the dependency tree.

N-gram language model 216 is a standard n-gram language model that provides the probability of sequences of words in a language. Under one embodiment, the n-gram language model is a tri-gram language model that provides the probability of a current word given two preceding words. N-gram language model 216 does not require any information from the target dependency tree or the source dependency tree. Instead, it is simply based on the word order of the target words.

Local tree order model 218 provides the probability of the order of a target dependency tree given a source dependency tree. Under the assumption that constituents move as a whole and that they are ordered independently, the following assumption for the probability of a complete order is made:

$$P(\text{order}(T) \mid S, T) = \prod_{t \in T} P(\text{order}(c(t)) \mid S, T) \qquad \text{EQ. 1}$$

where P(order(T)|S,T) is the probability of the word order in a target dependency tree T given the target dependency tree T and the source dependency tree S, P(order(c(t))|S,T) is the probability of the word order of nodes that modify a node t in the target dependency tree T given the source dependency tree and the target dependency tree, where c(t) is a function that returns the set of nodes that modify node t.

Furthermore, it is assumed that the position of each child node can be modeled independently in terms of a head-relative position, such that:

$$P(\text{order}(c(t)) | S, T) = \prod_{m \in c(t)} P(pos(m, t) | S, T) \quad \text{EQ. 2}$$

where P(pos(m,t)|S,T) is the probability of the head-relative position of modifying node m to parent node t given the source dependency tree and target dependency tree. The head-relative position is described as the number of modifiers before and after the parent node. For example, if two modifiers are before the parent node, the head-relative position of the modifier closest to the parent node is −1 and the head-relative position of the modifier furthest from the parent node is −2. Modifiers after the parent node have positive numbers such that the modifier closest to the parent node has a head-relative position of +1 and the next modifier as a head-relative position of +2.

Under one embodiment, the position probability P(pos(m, t)|S,T) is determined based on a small set of features reflecting local information in the dependency tree. This information includes the lexical items of the head and modifier, the lexical items of the source nodes aligned to the head and modifier, the part of speech of the source nodes aligned to the head and modifier, and the head-relative position of the source node aligned to the target modifier. For example, using source dependency tree 400 and target dependency tree 402 of FIG. 4, position probabilities associated with the target node for "propriété" would be:

P(pos(m)=−1|
lex($m_1$)="la", lex(h)="propriété",
lex(src($m_1$))="the", lex(src(h))="property",
cat(src($m_1$))=Determiner,cat(src(h))=Noun,
position src($m_1$))=−2)
P(pos($m_2$)=+1|
lex($m_2$)="Cancel", lex(h)="propriété",
lex(src($m_2$))="Cancel",
lex(src(h))="property",
cat(src $m_2$))=Noun,cat(src(h))=Noun,
position(src ($m_2$))=−1)

A training corpus is used to train the position probabilities of the local tree order model. The training corpus includes parallel sentences in both the source language and the target language from which source dependency trees and target dependency trees are formed and aligned. Feature values are extracted from each set of aligned training source dependency trees and target dependency trees to form probability distributions for each modifier position in the target language dependency tree. In one embodiment, a log-linear model is used to estimate these distributions.

Since the local tree order model learns to order whole subtrees of the target dependency tree, and since it uses syntactic information from the source, it provides an alternative view compared to the tri-gram language model. In particular, the local tree order model is able to capture long distance dependencies that the tri-gram language model does not capture.

The tri-gram language model and the local tree order model are combined to generate a score for possible word orders using a log-linear combination as:

$$P(o(T)|S,T) \propto P_{LM}(o(T)|T) P_{LTOM}(o(T)|S,T)^\lambda \quad \text{EQ. 3}$$

where P(o(T)|S,T) is the combined score for a target word order, o(T), $P_{LM}$(o(T)|(T)) represents the language model probability for the order o(T) and $P_{LTOM}$ (o(T)|S,T) represents the local tree order model probability for the order of the target words. λ is a weighting value which is selected based on a development set to maximize a translation metric. Under one embodiment, it has been set to 0.5.

Under one embodiment, the combination of the n-gram language model score and the local tree order model score is used to perform a bottom-up beam search to generate N-best orders for the target words given the source dependency tree and the target dependency tree. During this bottom up search, at each parent node, all possible word orders that are projective with respect to the target dependency tree are scored and the best N orders are retained for the node where the best N orders are determined from the score provided by EQ. 3.

N-best word order identification unit 214 stores each word order and its combined language model and local tree order model score as N-best word orders 220.

At step 108, a translation metric calculator 222 calculates a translation metric for each of the N-best word orders 220. An example of a translation metric is the Bilingual Evaluation Understudy (BLEU) metric, which works by measuring the n-gram co-occurrence between a given translation and a set of reference translations and then takes the weighted geometric mean. Although the BLEU translation metric is used in several embodiments, other translation metrics may be used in its place. Translation metric calculator 222 produces metric scored and language model and local tree order model scored N-best word orders 224.

Metric scored and language model and local tree order model scored N-best word orders 224 are provided to discriminative training module 226 along with source and target data 213. At step 110, discriminative training module 226 selects one of the N-best word orders for each target dependency tree based on the translation metric score for the N-best word orders of each tree. In one particular embodiment, the word order with the highest translation metric score for a target dependency tree is selected for the target dependency tree. At step 112, discriminative training module 226 discriminatively trains parameters of a word order model to optimize an objective function computed for the selected word orders of the target dependency trees.

Under one embodiment, the objective function is the sum of a negative log likelihood of training data and a quadratic regularization term described as:

$$L(\lambda) = -\sum_{l=1}^{L} \log p(o_{l,1} | sp_l, \lambda) + \frac{1}{2\sigma^2} \sum_{m=1}^{M} \lambda_m^2 \quad \text{EQ. 4}$$

B where L(λ) is the objective function that is optimized for a feature weight vector λ consisting of M feature weights, $\lambda_m$, $$\frac{1}{2\sigma^2} \sum_{m=1}^{M} \lambda_m^2$$

is the quadratic regularization term and:

$$-\sum_{l=1}^{L} \log p(o_{l,1} | sp_l, \lambda) = -\sum_{l=1}^{L} \frac{e^{\lambda F(o_{l,1}, sp_l)}}{\sum_{n'=1}^{N} e^{\lambda F(o_{l,n'}, sp_l)}} \quad \text{EQ. 5}$$

where $sp_l$ is a source dependency tree-target dependency tree pair, with L such pairs in the source and target data 213, $o_{l,1}$ is the word order with the highest translation metric for the lth source dependency tree-target dependency tree, $o_{l,n'}$ represents n'th word order for the source dependency tree-target dependency tree pair $sp_l$, represents a feature vector consisting of M feature functions designated as $F_M(o_{l,n}, sp_l)$, and $\sigma^2$ is a constant determining the strength of the regularization term. In one embodiment, a value of $\sigma=1$ is used.

The objective function in EQ. 4 is optimized by minimizing the objective function. Other objective functions may be used in place of the objective function of EQ. 4. For example, the expected BLEU score could have been selected as the objective function.

The feature functions $F_m$ under one embodiment include the combination of the n-gram language model score and local tree order model score of EQ. 3 and a set of integer-valued features that have values of 0, 1 or an integer k greater than 1, depending on whether the feature is present k times (k) or absent (0) that include word bi-gram features, displacement features, Pharaoh displacement features, and combinations of part of speech features for source words and part of speech features for target words. Each integer-valued feature is evaluated at each position of the target word order and the values for different positions are added to obtain values for complete orders.

The word bi-gram features are binary features that describe whether the current word in the target word order and the preceding word in the target word order match particular bi-grams. For example, a bi-gram feature may be provided for the bi-gram "red car".

The displacement features represent the relative positioning of the source words aligned with the current target word and the previous target word. Under one embodiment, there are three features provided: one for parallel positioning, one for crossing positioning and one for widening positioning. The target words and source words are parallel if the two aligned source words appear next to each other and in the same order as the current target word and the previous target word. The relationship between the target words and source words are crossing if the order of the source words is reversed from the order of the target words. The relationship between the source words and the target words is widening if the source words are in the same order as the target words but are separated in the source sentence.

The Pharaoh displacement features describe a displacement value equal to one less than the difference between the positions of the source words aligned to the current target word and the previous target word. Thus, for source words that are next to each other, the Pharaoh displacement feature will have a value of 0 for that position. If the source words are separated by k words, the Pharaoh displacement feature will have a value of k for that position.

The source part of speech features provide a binary value for each of a set of possible part of speech tags for the source word aligned with the current target word. Similarly, the target part of speech features provide a separate feature for each of a set of part of speech tags for the current target word. The source and target part of speech features are always used in combination with other features. For example, the displacement feature is augmented with source and target parts of speech. In this case we have a binary feature for each combination of a displacement pattern (parallel, crossing, widening), and a source and a target part of speech corresponding to the current position.

In addition to the features listed above, additional feature may be used. For example, the displacement of three source words aligned with three consecutive target words may be used to form features as well as part of speech tags for children nodes of parent nodes in the target dependency tree or the source dependency tree.

An additional feature is also a displacement feature which measures displacement of the position of the current word with respect to the position determined by a machine translation system. For example, if the machine translation system placed the word "car" in position 5, and the current word order places it in position 6, this displacement feature will have the value 1 for that word. Such displacement feature may be further combined with other features such as part of speech tags.

During discriminative training, the feature weights vector $\lambda$ is optimized based on the objective function of EQ. 4 resulting in discriminatively trained word model parameters 228, wherein the model parameters are the $\lambda$ vector. At step 114, the discriminatively trained word order model parameters are stored on a computer-readable storage medium for use in ordering target words in translations from a source sentence to a target sentence.

Figure 6:
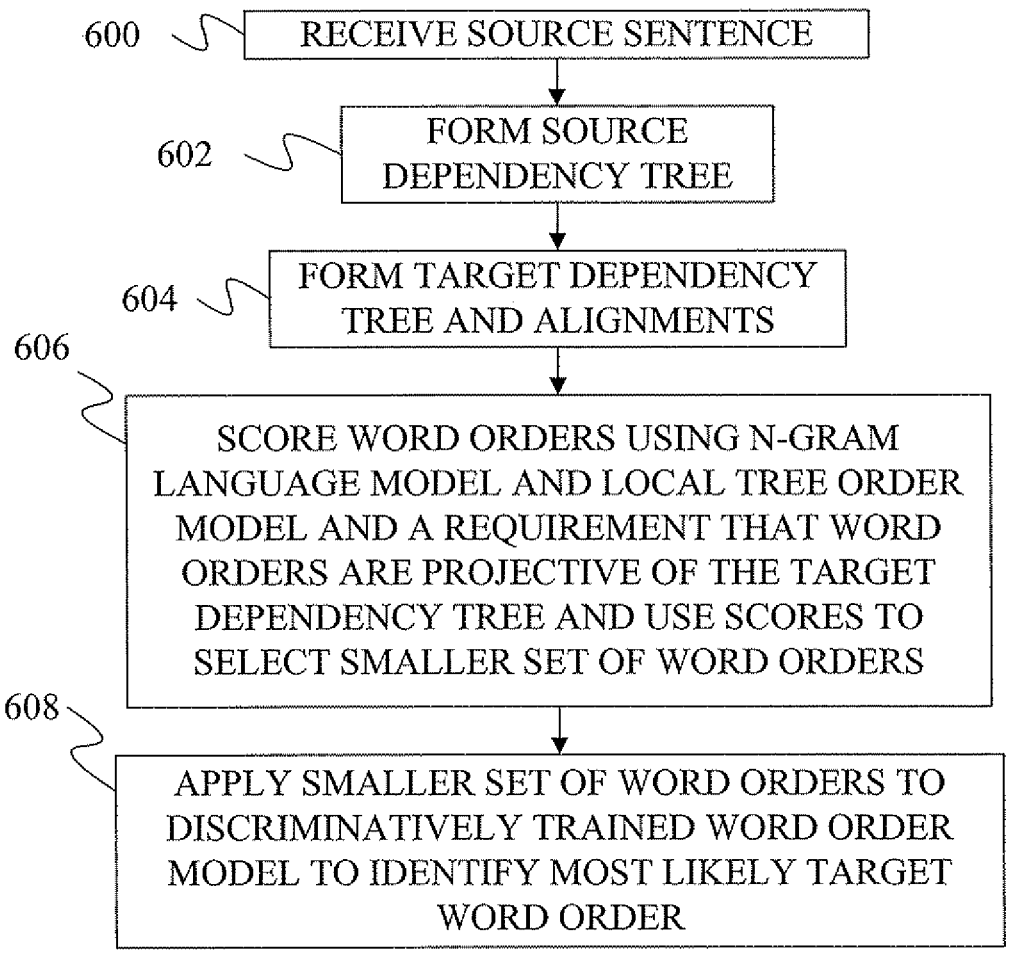
FIG. 6 is a flow diagram of a method of using a discriminatively trained word order model to reorder a set of translated words.
Figure 7:
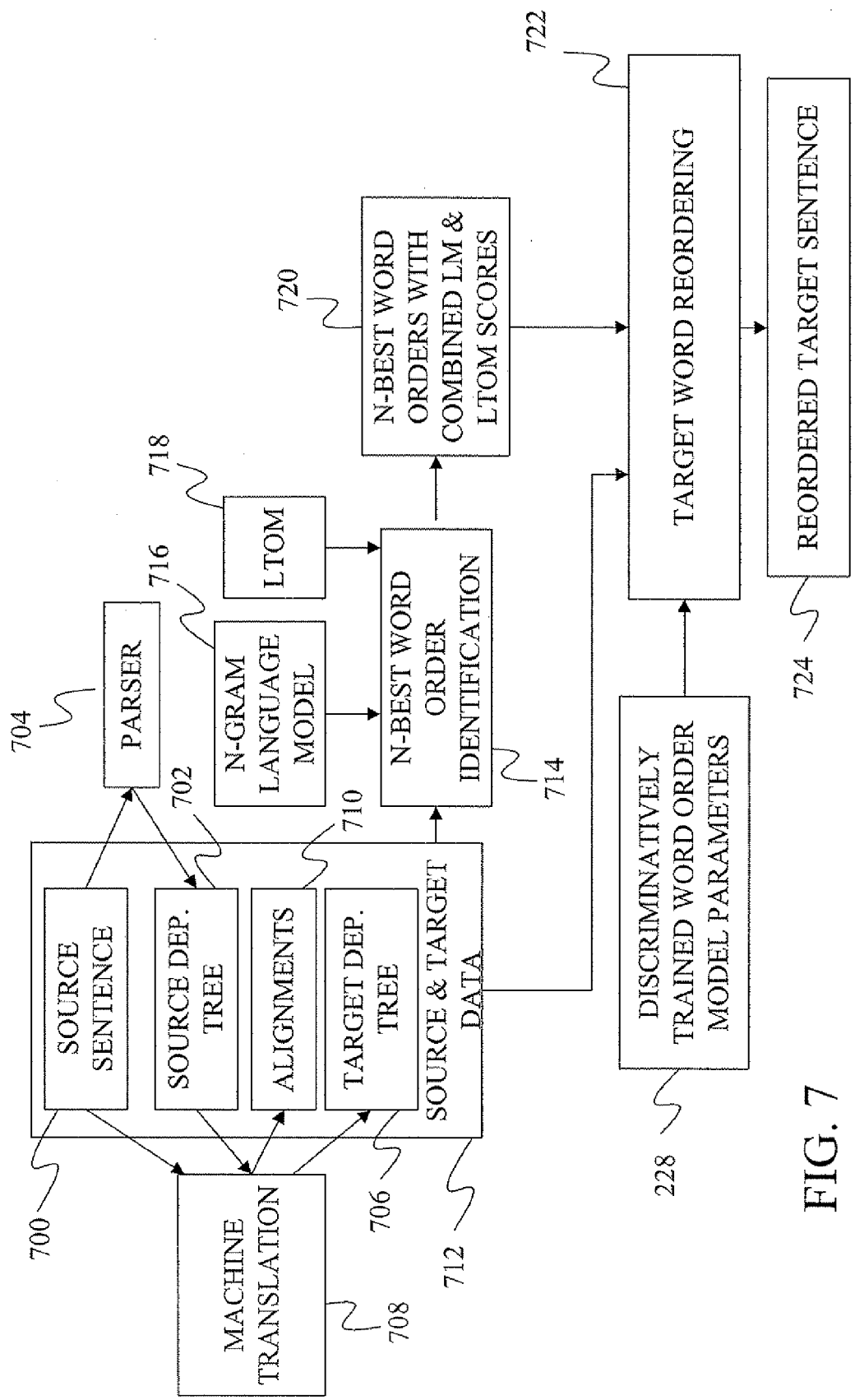
FIG. 7 is block diagram of elements used in the method of FIG. 6.

Once the word order model parameters have been discriminatively trained, they may be used to reorder target words translated from source sentences. FIG. 6 provides a flow diagram for performing such reordering and FIG. 7 provides elements used in the method of FIG. 6.

In step 600, source sentence 700 is received. At step 602, source dependency tree 702 is formed by a parser 704, which operates in a manner similar to parser 204 of FIG. 2.

At step 604, target dependency tree 706 is formed by a machine translation system 708. Under one embodiment, target dependency tree 706 is formed from source dependency tree 702 by a machine translation 708 using the treelet pair translation described above. Machine translation 708 also produces an alignment 710 that describes the alignment between target words in target dependency tree 706 and source words in source dependency tree 702.

Together, source sentence 700, source dependency tree 702, target dependency tree 706, and alignment 710 form source and target data 712.

At step 606, source and target data 712 are provided to N-best word order identification unit 714, which identifies a set of possible word orders using n-gram language model 716, local tree order model 718 and the requirement that all such word orders be projective with respect to the target dependency tree 706. N-best word order identification unit 714 works in the same manner as the n-best word order identification unit 214 of FIG. 2 and uses a combination of an n-gram language model probability and a local tree order model probability to score each word order that is projective with respect to the target dependency tree and to select the N word orders with the highest combined log probability. N-best word order identification unit 714 produces N-best target word orders 720 together with the combined language model and local tree order model scores for each word order.

At step 608, the source and target data 712, the N-best target word orders with combination language model and local tree order model scores 720 are provided to a target word reordering unit 722, which uses discriminatively trained word order model parameters 228 to select one of the N-best target word orders as a reordered target sentence 724. To select the best target word order from the N-best target word orders, target word reordering unit 722 computes a score for each of the N-best word orders as:

$$p(o_n | sp, \lambda) = \frac{e^{\lambda F(o_n, sp)}}{\sum_{n'=1}^{N} e^{\lambda F(o_{n'}, sp)}} \quad \text{EQ. 6}$$

where $p(o_n|sp,\lambda)$ is the probability for the nth target word order of the N-best target word orders given the source dependency tree-target dependency tree pair, sp, formed by source dependency tree 702 and target dependency tree 706 and the feature vector $\lambda$; $F(o_n,sp)$ is the feature vector of feature functions for the source dependency tree-target dependency tree pair, sp, and the nth target word order and the summation in the denominator of EQ. 6 is across all possible word orders in the N-best list of word orders. The features of the feature vectors are the same features used to train the discriminatively trained word order model parameters and their values are determined based on source and target data 712 and language model and local tree order model scores provided with the N-best target word orders 720.

The word order that provides the highest probability using EQ. 6 is selected as the best target word order and is output as the reordered target sentence 724.

Thus, FIGS. 6 and 7 provide a means for reordering target sentences formed through a machine translation by using word order model parameters that have been discriminatively trained based upon a translation metric such that the reordered target sentence is likely to have a better translation metric than the original machine translation.

In addition to reordering a single translation output by an MT system, multiple translations can also be reordered. In this case, the MT system outputs, for a given source sentence, K target sentences with source and target dependency trees. Each of the target sentences can be reordered using the architecture shown in FIG. 7. Then a single reordered translation is output by choosing the translation that maximizes the score:

Total_Score=MT_score(t)+α*order_score(o(t))+
β*language_model_score(t)

where MT_score(t) is the machine translation score for this translation, order_score is the word order score for the target sentence computed using equation 6 above, language_model_score(t) is the language model score for the target sentence, and α and β are weights.

Figure 8:
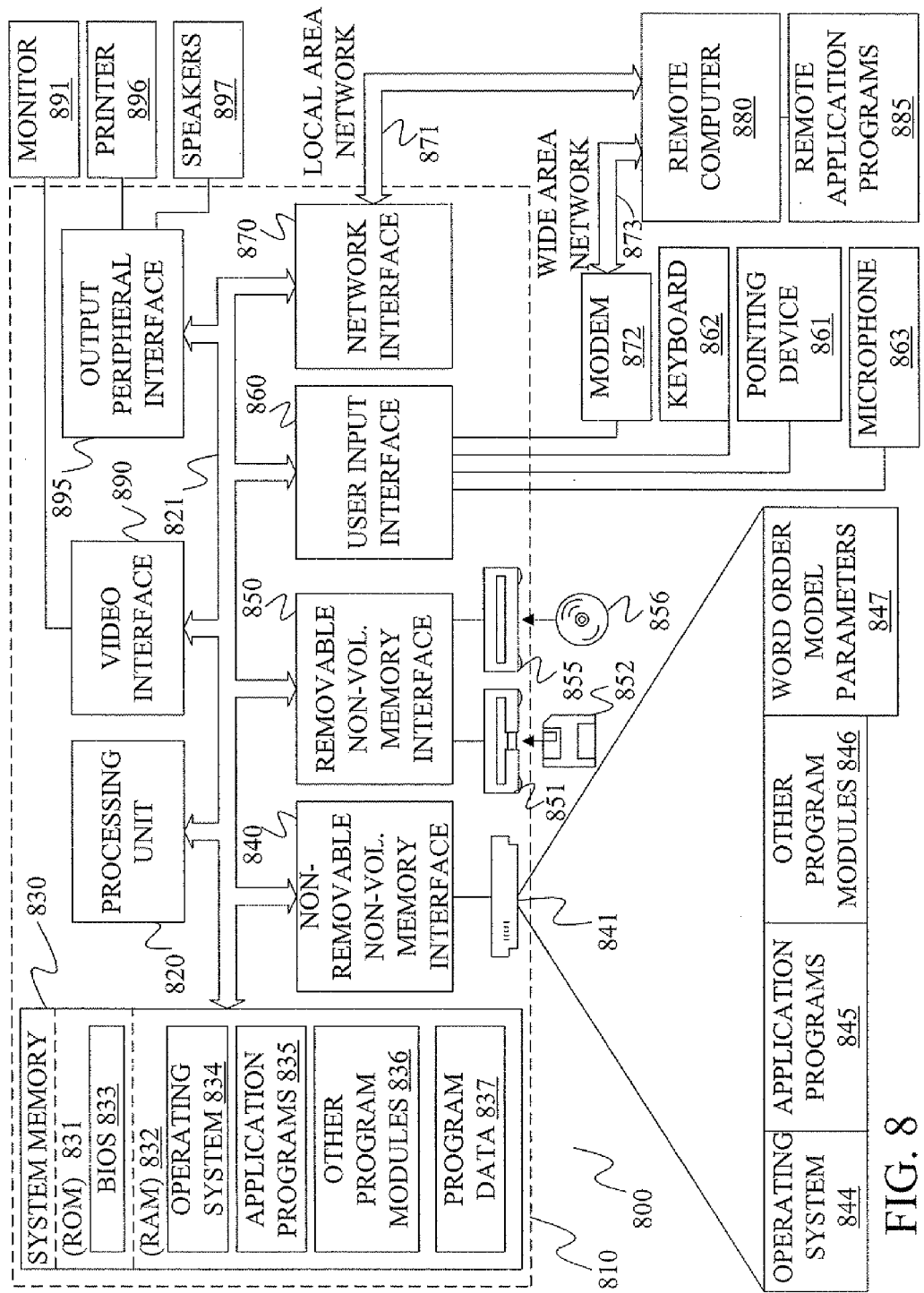
FIG. 8 is a block diagram of a general computing environment in which an embodiment of the present invention may be practiced.

FIG. 8 illustrates an example of a suitable computing system environment 800 on which embodiments may be implemented. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an exemplary system for implementing some embodiments includes a general-purpose computing device in the form of a computer 310. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer-readable storage media and computer-readable communication media. Computer-readable storage media includes both volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computer 810. Computer-readable communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, computer-readable communication media includes wired media such as a wired network or direct-wired connection, and wireless media such as acoustic, RF, infrared and other wireless media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD RON or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and word order model parameters discriminatively trained through the embodiments described above. Note that these components can either be the same as or different from operating system 834, application programs 835, and other program modules 836. Operating system 844, application programs 845, and other program modules 846 are given different numbers here to illustrate that, at a minimum, they are different copies. Operating system 844, application programs 845, other program modules 846 and word order model parameters 847 may be stored on any computer-readable storage media and not only hard disc drive 841.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   forming a source dependency tree for a source sentence in a source language, the source dependency tree indicating the syntactic hierarchy of source words in the source sentence;
   forming a target dependency tree indicating the syntactic hierarchy of target words in a target language that are translations of source words in the source sentence;
   identifying a plurality of target word orders after forming the target dependency tree, where each target word order contains the words in the target dependency tree, wherein identifying a plurality of target word orders after forming the target dependency tree comprises restricting the word orders in the plurality of word orders to word orders that are projective with respect to the target dependency tree such that each word and the word's descendants in the target dependency tree form a contiguous subsequence in the word order;
   identifying N-best target word orders from the plurality of target word orders by determining a score for each target word order by combining a language model probability that provides a probability of the target words appearing in a surface form in that order and a local tree order model probability that provides a probability for positions of words assigned to child nodes relative to positions of words assigned to head nodes in the target dependency tree;
   using a discriminatively trained word order model to identify a most likely target word order from the N-best target word orders, wherein for each target word order in the N-best target word orders, the discriminatively trained word order model uses features based on information in the source dependency tree and the target dependency tree and features based on the order of words in the target word order.

2. The method of claim 1 wherein the features based on information in the source dependency tree and the target dependency tree use part of speech tags for words in the source dependency tree and part of speech tags for words in the target dependency tree.

3. The method of claim 2 wherein the discriminatively trained word order model uses as features the language model probability of the target words appearing in a surface form in the target word order and a local tree order model probability that provides a probability for positions of words assigned to child nodes relative to positions of words assigned to head nodes in the target dependency tree.

4. The method of claim 1 wherein the features based on the order of words in the target word order comprise features that indicate how words in the source sentence are positioned relative to each other where the words are translations of two contiguous target words in the target word order.

5. The method of claim 1 wherein the discriminatively trained word order model is trained based on N-best target word orders identified by scoring each of a plurality of word orders based on a language model probability that provides a probability of the target words appearing in a surface form in that order and a local tree order model probability that provides a probability for positions of words assigned to child nodes relative to positions of words assigned to head nodes in a target dependency tree.

6. A method comprising:
receiving a target dependency tree comprising target words translated from source words of a source dependency tree, the target dependency tree and the source dependency tree providing hierarchical relationships between words;
forming a plurality of word orders for the target words after receiving the target dependency tree by restricting the word orders in the plurality of word orders to those word orders that are projective with respect to the received target dependency tree such that each word and the word's descendants in the target dependency tree form a contiguous subsequence in the word order;
scoring the plurality of word orders for the target words to form word order scores, wherein scoring a word order in the plurality of word orders comprises:
determining an n-gram language model probability for the word order; and
determining a local tree order model probability that is based on information from the source dependency tree, the target dependency tree and the word order;
using the word order scores to select a smaller set of word orders for the target words from the plurality of word orders for the target words;
using the smaller set of word orders of the target words to discriminatively train a model for selecting orders of target words by:
determining a translation metric score for each word order in the smaller set of word orders;
selecting a word order from the smaller set of word orders based on the translation metric score; and
discriminatively training parameters of the model to optimize an objective function computed for the selected order by minimizing a negative log-likelihood of the selected order, wherein the log-likelihood comprises the log of a score for the selected word order over a sum of scores for each word order in the smaller set of word orders; and
storing the parameters for the model on a computer-readable storage medium for use in ordering words in translations.

7. The method of claim 6 wherein the target words are translated from the source words using machine translation.

8. The method of claim 7 wherein some target words may be incorrect translations of source words.

9. A computer-readable storage medium having computer-executable instructions for performing steps comprising:
receiving a target dependency tree for a target sentence having words ordered in a first word order, wherein the received target dependency tree is formed based on a machine translation from a source language to a target language;
reordering words in the target sentence to identify a second word order through steps comprising:
while limiting consideration of word orders to those word orders that are projective with respect to the received target dependency tree, identifying a first set of possible word orders;
scoring each of the possible word orders in the set of possible word orders;
selecting N-best scoring word orders from the set of possible word orders;
determining likelihoods for each of the N-best scoring word orders using feature values derived from the received target dependency tree and the N-best scoring word orders; and
selecting one of the word orders from the N-best scoring word orders based on the likelihoods.

10. The computer-readable storage medium of claim 9 further comprising identifying a source dependency tree for the source sentence.

11. The computer-readable storage medium of claim 10 wherein scoring each of the possible word orders comprises using a combination of an n-gram language model and a local tree order model.

12. The computer-readable storage medium of claim 11 wherein the local tree order model provides a score based on the source dependency tree, the target dependency tree and the word order of target words.

13. The computer-readable storage medium of claim 12 wherein determining likelihoods for the N-best word orders comprises using feature weights that have been discriminatively trained based on word orders scored using a translation metric.

14. The computer-readable storage medium of claim 13 wherein the feature values use values for part of speech features for target words.

15. The computer-readable storage medium of claim 14 wherein the feature values use values for part of speech features for source words.

16. The computer-readable storage medium of claim 15 wherein the feature values comprise the score from the combination of the n-gram language model and the local tree order model.

17. The computer-readable storage medium of claim 16 wherein two contiguous target words in a word order of target words are respective translations of two source words in the source sentence and wherein the feature values comprise values for features that describe the position of the two source words relative to each other in the source sentence.

* * * * *